United States Patent
Sato et al.

(10) Patent No.: US 11,789,215 B2
(45) Date of Patent: Oct. 17, 2023

(54) OPTICAL CONNECTOR AND OPTICAL CONNECTING STRUCTURE

(71) Applicant: Nippon Telegraph and Telephone Corporation, Tokyo (JP)

(72) Inventors: Norio Sato, Tokyo (JP); Satoshi Shigematsu, Tokyo (JP); Hiroshi Ishikawa, Tokyo (JP); Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/620,553

(22) PCT Filed: Jun. 25, 2019

(86) PCT No.: PCT/JP2019/025123
§ 371 (c)(1),
(2) Date: Dec. 17, 2021

(87) PCT Pub. No.: WO2020/261374
PCT Pub. Date: Dec. 30, 2020

(65) Prior Publication Data
US 2022/0244468 A1    Aug. 4, 2022

(51) Int. Cl.
*G02B 6/38* (2006.01)
*G02B 6/42* (2006.01)
(Continued)

(52) U.S. Cl.
CPC .......... *G02B 6/3886* (2013.01); *G02B 6/4228* (2013.01); *G02B 6/02052* (2013.01); *G02B 6/262* (2013.01)

(58) Field of Classification Search
None
See application file for complete search history.

(56) References Cited

U.S. PATENT DOCUMENTS 4,690,495 A  *  9/1987  Giannini ................. G02B 6/32
                                                           385/74
9,374,163 B2 *  6/2016  Usui ............... H04B 10/25891
(Continued)

FOREIGN PATENT DOCUMENTS

JP    S53147547 A    12/1978
JP    S5439060 U     3/1979
(Continued)

OTHER PUBLICATIONS

Kaizu, K., "Technical Trends of Optical Connectors for Optical Mounting," Journal of Electronics Packaging Society, vol. 7, No. 3, 2004, 11 pages.
(Continued)

*Primary Examiner* — Jerry Rahll
(74) *Attorney, Agent, or Firm* — Slater Matsil, LLP

(57) ABSTRACT

An embodiment optical connector includes a fiber having a core through which light is guided and a magnet attached to one end of the fiber, and the magnet has an opening that exposes at least the end face of the core. An embodiment optical connection structure includes a first optical connector and a second optical connector, each including a fiber having a core through which light is guided and a magnet attached to one end of the fiber, wherein the magnets are magnetized so as to exert attraction on each other, and when the first optical connector and the second optical connector are mechanically connected by magnetic forces, the core of the first optical connector and the core of the second optical connector are optically connected through the opening of the magnet of the first optical connector and the opening of the magnet of the second optical connector.

18 Claims, 14 Drawing Sheets

(51) Int. Cl.
    *G02B 6/02*           (2006.01)
    *G02B 6/26*           (2006.01)

(56) References Cited

U.S. PATENT DOCUMENTS

| | | | |
|---|---|---|---|
| 9,869,826 B1* | 1/2018 | Shang | G02B 6/3886 |
| 11,480,740 B2* | 10/2022 | Paschalis | A61F 2/142 |
| 2007/0218775 A1* | 9/2007 | Coronado | H01R 13/6205 |
| | | | 439/681 |
| 2014/0120746 A1* | 5/2014 | Persion | H01R 13/6205 |
| | | | 439/39 |
| 2015/0063746 A1* | 3/2015 | Usui | G02B 6/4214 |
| | | | 385/14 |
| 2017/0269312 A1* | 9/2017 | Mitsui | G02B 6/4228 |
| 2017/0299816 A1* | 10/2017 | Mitsui | G02B 6/4256 |
| 2020/0083670 A1* | 3/2020 | Kim | H01S 5/0237 |
| 2020/0379189 A1* | 12/2020 | Paschalis | A61B 3/16 |

FOREIGN PATENT DOCUMENTS

| | | | |
|---|---|---|---|
| JP | H04333804 A | | 11/1992 |
| JP | 2015049404 A | | 3/2015 |
| WO | 0219010 A1 | | 3/2002 |

OTHER PUBLICATIONS

Masuko, K. et al., "A Low Cost PON Transceiver using Single TO-CAN Type Micro-BOSA," Electronic Components and Technology Conference, May 30, 2006, 5 pages.

\* cited by examiner

OPTICAL CONNECTOR AND OPTICAL CONNECTING STRUCTURE

This patent application is a national phase filing under section 371 of PCT application no. PCT/JP2019/025123, filed Jun. 25, 2019, which application is incorporated herein by reference in its entirety.

TECHNICAL FIELD

The present invention relates to an optical connector and an optical connection structure, and more particularly to an optical connector and an optical connection structure used to connect fibers that allow the passage of light and connect a fiber and an optical element.

BACKGROUND

Connectors have been used to connect fibers that allow the passage of light. Generally, the connector has a volume of about 1 cm$^3$, which is very large compared to the diameter of a coated fiber of 250 μm. For example, in an optical connection structure 900 that connects fibers 901a, 901b respectively having cores 902a, 902b through which light is guided, as illustrated in FIG. 15, an end of each of the fibers 901a, 901b are inserted into capillaries 903a, 903b, respectively, and the centers of the two fibers 901a, 901b are aligned with each other by a sleeve 904. Thus, in addition to the fibers 901a, 901b, members for connecting the fibers 901a, 901b have been required, and the size of the connection structure has been increased (e.g., see Non-Patent Literature 1).

A connection structure 1000 called a "CAN package" illustrated in FIG. 16 includes: a pigtail 1004 made up of a fiber 901, a capillary 902, and a ferrule 1003; a cap 1006 to which a lens 1005 is fixed; and a base 1008 to which a chip 1007 is fixed. Here, for example, a light-receiving element is formed on the chip 1007.

In the connection structure 1000 as above, it is necessary to align three bodies of the pigtail 1004, the cap 1006, and the base 1008 so that light emitted from the end face of the fiber 901 has a beam shape 1009. At this time, "active alignment" is performed in which the three bodies are aligned while light is passed through the fiber 901 and the light intensity at the chip 1007 is detected. After the alignment, the members described above are fixed in that state by welding (see Non-Patent Literature 2).

CITATION LIST

Non-Patent Literature

Non-Patent Literature 1: "Technological Trend of Optical Packaging Connectors" KAIZU Katsumi, Journal of Japan Institute of Electronics Packaging Vol. 7, No. 3, pp. 208-212, 2004.
Non-Patent Literature 2: "A low cost PON transceiver using single TO-CAN type micro-BOSA" K. Masuko et al., Electronic Components and Technology Conference, pp. 1082-1086, 2006.

SUMMARY

Technical Problem

As described above, in the connection using the fibers, the final size of the connector is larger than that of the fiber itself. In the optical connection structure including the lens, the light-receiving element, a light-emitting element, and the like in addition to the fiber, the active alignment is required, and the structure and process for the active alignment are complicated.

Accordingly, it is an object of embodiments of the present invention to provide a smaller optical connector and optical connection structure used for connecting fibers and connecting a fiber and an optical element. It is another object of embodiments of the present invention to provide an optical connector and an optical connection structure not requiring active alignment but capable of passive alignment.

Means for Solving the Problem

For achieving the above objects, an optical connector according to embodiments of the present invention includes: a fiber having a core through which light is guided; and a magnet attached to one end of the fiber, and the magnet has an opening that exposes at least the end face of the core.

An optical connection structure according to embodiments of the present invention includes: a first optical connector; and a second optical connector. Each of the first optical connector and the second optical connector is the optical connector described above, and the magnet of the first optical connector and the magnet of the second optical connector are magnetized so as to exert attraction on each other, and when the first optical connector and the second optical connector are mechanically connected by magnetic forces, the core of the first optical connector and the core of the second optical connector are optically connected through an opening of the magnet of the first optical connector and an opening of the magnet of the second optical connector.

An optical connection structure according to embodiments of the present invention includes: a first optical connector; and a second optical connector. The first optical connector is the optical connector described above, the second optical connector includes an optical element and a magnet attached to the optical element, the magnet of the second optical connector has an opening that exposes at least a part of the optical element, and the magnet of the first optical connector and the magnet of the second optical connector are magnetized so as to exert attraction on each other, and when the first optical connector and the second optical connector are mechanically connected by magnetic forces, the core of the first optical connector and the optical element of the second optical connector are optically connected through an opening of the magnet of the first optical connector and the opening of the magnet of the second optical connector.

Effects of Embodiments of the Invention

According to embodiments of the present invention, it is possible to provide a smaller optical connector and optical connection structure used for connecting fibers and connecting a fiber and an optical element. Further, according to embodiments of the present invention, active alignment is not required, and passive alignment can be achieved.

DETAILED DESCRIPTION OF ILLUSTRATIVE EMBODIMENTS

Embodiments of the present invention will be described below with reference to the drawings.

First Embodiment

Figure 1A:
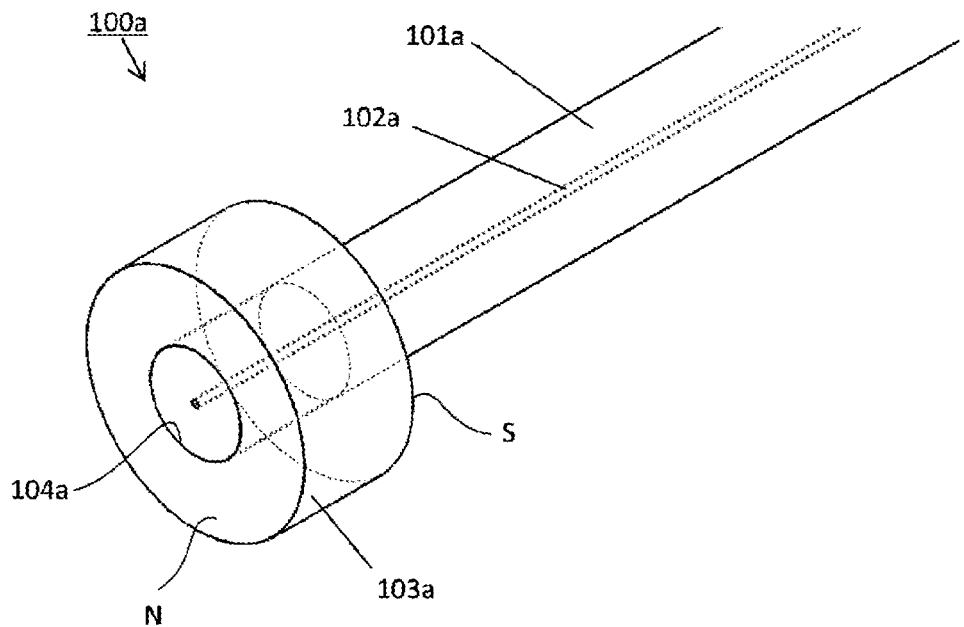
FIG. 1A is a perspective view illustrating a configuration of an optical connector according to a first embodiment of the present invention.

FIG. 1A illustrates a configuration of an optical connector 100a according to a first embodiment of the present invention. The optical connector 100a according to the present embodiment is made up of a fiber 101a having a core 102a through which light is guided, and a magnet 103a attached to one end of the fiber 101a. The magnet 103a is formed in a hollow cylindrical shape and has a hole into which one end of the fiber 101a is inserted. The end face of the core 102a of the fiber 101a inserted into the hole of the magnet 103a is exposed from an opening 104a of the magnet 103a.

In the optical connector 100a according to the present embodiment, the outer shape of the cross section of the magnet 103a perpendicular to the longitudinal direction of the fiber 101a is circular like the outer shape of the cross section of the core 102a perpendicular to the longitudinal direction of the fiber 101a, and the two outer shapes are similar to each other. For example, the fiber 101a has an outer diameter of 125 μm, and the core 102a has an outer diameter of 9 μm. In contrast, the magnet 103a has an outer diameter of 300 μm, an inner diameter of 125 μm, and a thickness (i.e., a length along the longitudinal direction of the fiber 101a) of 150 μm.

The end face of the fiber 101a is aligned and flush with the end face of the magnet 103a having the opening 104a. One end of the fiber 101a is fitted into a hole formed in the magnet 103a and mechanically fixed thereto. When the mechanical strength is insufficient, an adhesive may be formed thinly with a thickness of 1 μm or less between the fiber 101a and the magnet 103a.

Figure 1B:
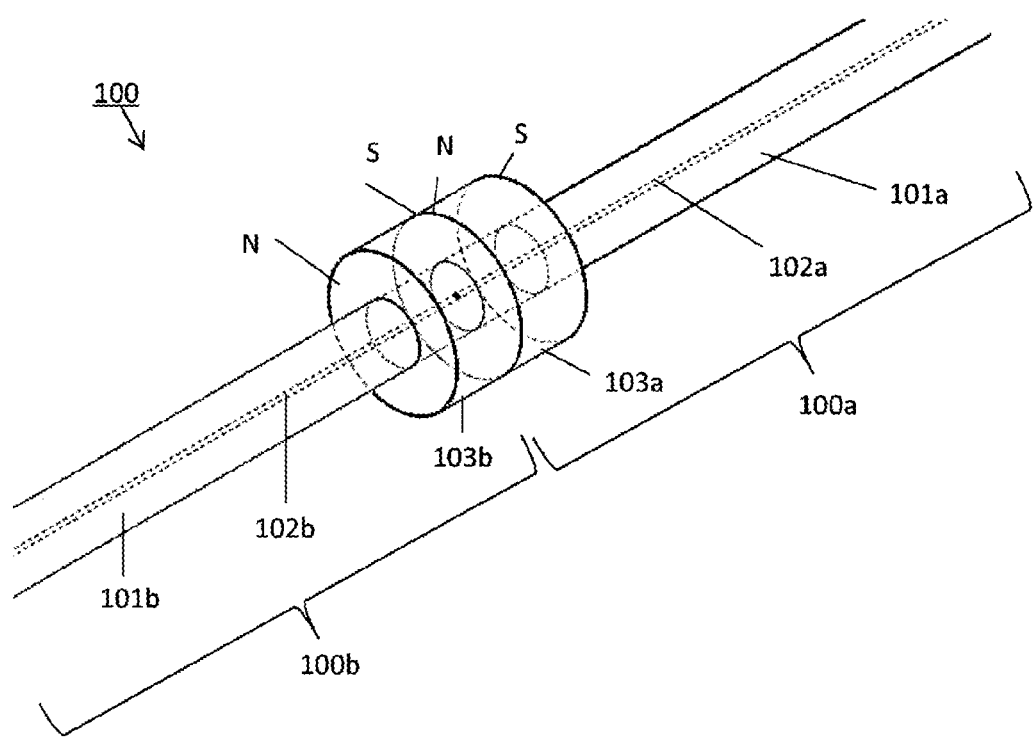
FIG. 1B is a perspective view illustrating a configuration of an optical connection structure according to the first embodiment of the present invention.
Figure 1C:
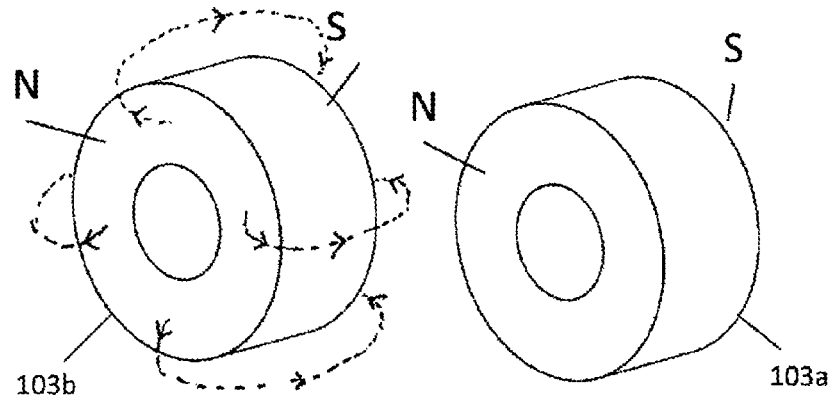
FIG. 1C is a view illustrating an example of magnets used in the optical connection structure according to the first embodiment.

FIG. 1B illustrates an optical connection structure 100 in which two of the above optical connectors are connected. FIG. 1C illustrates magnets 103a, 103b included in the optical connection structure 100. In FIG. 1C, a dotted line with an arrow indicates a magnetic field line from the N-pole to the S-pole.

In the present embodiment, as an example, both the magnets 103a, 103b are magnetized so as to be polarized in a direction along the axis of the hollow cylindrical shape. The planes intermediate between the N-poles and the S-poles of the magnets 103a, 103b are perpendicular to the longitudinal directions of the fibers 101a, 101b, respectively.

As illustrated in FIGS. 1B and 1C, the direction of polarization of the N-pole and the S-pole is opposite between the magnets 103a, 103b. The magnet 103a has one N-pole on the fiber-end-face side and one S-pole on the back surface side thereof, and the magnet 103b has one S-pole on the fiber-end-face side and one N-pole on the back surface side thereof.

Since the direction of polarization of the S-pole and the N-pole is opposite between the magnet 103a of the optical connector 100a and the magnet 103b of the optical connector 100b as viewed from the end face of the fiber, when the magnet 103a and the magnet 103b are arranged along the axis parallel to the fibers 101a, 101b, the N-pole and the S-pole on the surfaces facing each other are attracted to each other, and the magnet 103a and the magnet 103b are spontaneously attracted to each other by magnetic attraction and are connected mechanically. In a state where the magnets 103a, 103b are attracted to each other, the relative positions of the magnets 103a, 103b in the direction perpendicular to the longitudinal direction of the fibers 101a, 101b are determined uniquely. As a result, the core 102a of the fiber 101a is aligned with the core 102b of the fiber 101b.

When the fibers 101a, 101b are used in this state with light passing therethrough, a good optical connection can be ensured by previously applying matching oil to the end faces that are connected to each other.

The end faces of the fibers 101a, 101b may be polished into a convex spherical surface, and then the core portion may be deformed by physical contact for the optical connection. A force Fp required for the physical contact is approximately expressed as: $Fp=(4a^3E)/3R (1-v^2)$. Here, E and v are an elastic modulus and a Poisson's ratio of glass, respectively, a is a contact radius, and R is a radius of curvature of the convex spherical surface.

On the other hand, a magnetic attraction Fm is approximately expressed as: $Fm=KB^2S/2\mu_o$. Here, K is a correction coefficient, B is a magnetic flux density, S is an area, and $\mu_o$ is a magnetic permeability of a vacuum. When assuming typical values in the physical contact of the fiber Fp is about 1 mN, and when an appropriate magnetic material for the shapes of the magnets 103a, 103b is selected, Fm can be several mN at a magnetic flux density of about 0.03 T, so that the physical contact is also possible.

When there is no need for removal, the fibers 101a, 101b may be fixed with an adhesive or the like and then used with light passing therethrough. Conventionally, a relatively large connector member and active alignment work have been required, but the optical connector and optical connection structure according to the present embodiment each have a simple and compact structure made up only of the fibers 101a, 101b and the magnets 103a, 103b, and since the magnets 103a, 103b are passively aligned by the attraction of each of the magnets, the alignment process can be simplified.

Figure 2A:
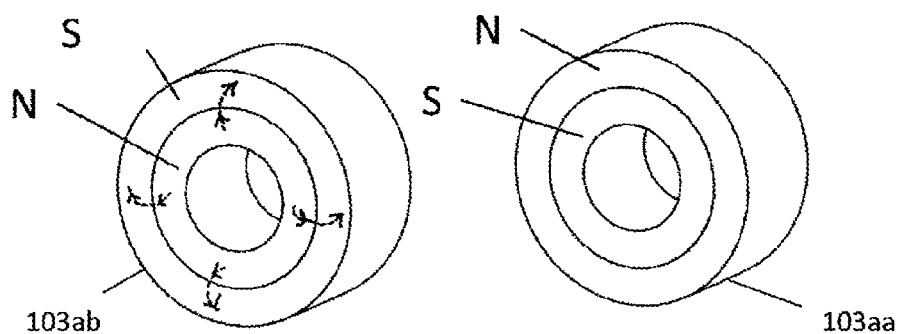
FIG. 2A is a view illustrating a modification example of magnets used in the optical connection structure according to the first embodiment.
Figure 2B:
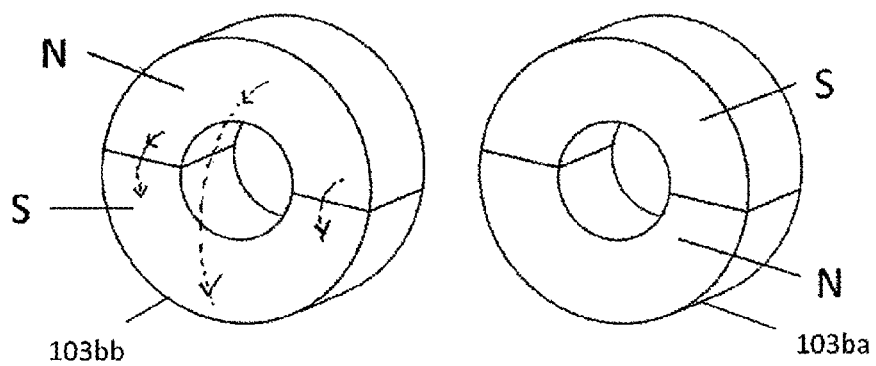
FIG. 2B is a view illustrating a modification example of the magnets used in the optical connection structure according to the first embodiment.
Figure 2C:
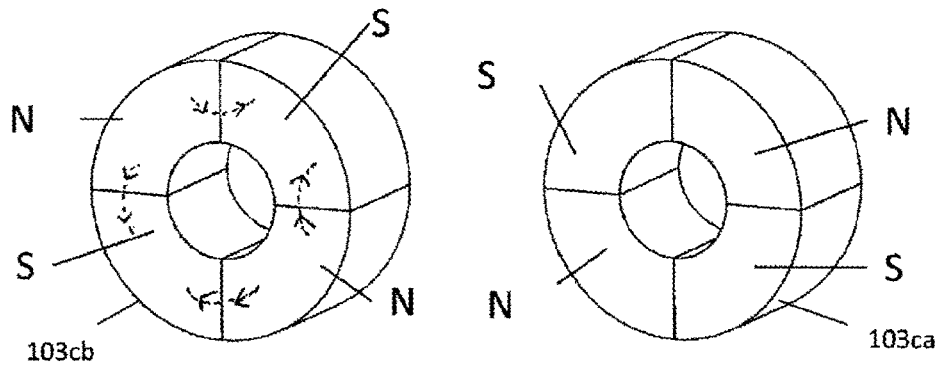
FIG. 2C is a view illustrating a modification example of the magnets used in the optical connection structure according to the first embodiment.

FIGS. 2A to 2C illustrate several modification examples of the magnetization of the magnets 103a, 103b.

The two magnets 103aa, 103ab illustrated in FIG. 2A are examples in which the two magnets are each formed in a hollow cylindrical shape and magnetized radially away from the axis of the hollow cylindrical shape. A dotted line with an arrow indicates a magnetic field line from the N-pole to the S-pole. Each of the magnets 103aa, 103ab is polarized in the radial direction and the plane intermediate between the N-pole and the S-pole has a cylindrical shape surrounding the axis of the hollow cylindrical shape. In the example illustrated in FIG. 2A, the magnet 103aa is magnetized to have the S-pole on the inner circumferential surface side and the N-pole on the outer circumferential surface side, while the magnet 103ab is magnetized to have the N-pole on the inner circumferential surface side and the S-pole on the outer circumferential surface side.

When the magnet 103aa and the magnet 103ab are arranged to face each other, the two magnets are spontaneously attracted to each other by magnetic attraction since the direction of polarization of the N-pole and the S-pole is opposite between the magnet 103aa and the magnet 103ab.

In the modification example illustrated in FIG. 2A, when the axes of the two fibers connected to the magnet 103aa and the magnet 103ab are displaced, the same magnetic poles (e.g., the N-pole and the N-pole) approach each other to generate a repulsive force, and hence the magnet 103aa and the magnet 103ab are hardly displaced from predetermined positions in a direction perpendicular to the longitudinal direction of the fiber. Therefore, compared to the example illustrated in FIG. 1C, a force for alignment in the direction of axial displacement is strong.

FIG. 2B illustrates an example, as another modification example, in which two magnets 103ba, 103bb formed in a hollow cylindrical shape are polarized into regions divided by a plane including the axis of the hollow cylindrical shape.

In the example illustrated in FIG. 1C described above, it has been necessary to prepare, as the magnets 103a, 103b, two kinds of magnets magnetized to have the N-pole and the S-pole, respectively, when viewed from the end face of the fiber. In the example illustrated in FIG. 2A as well, it has been necessary to prepare, as the magnets 103aa, 103ab, two kinds of magnets in which the surfaces close to the outer circumference of the attached fiber are N-pole and the S-pole, respectively, and it has been necessary to prepare two kinds of magnets magnetized in different directions.

In contrast, in the example illustrated in FIG. 2B, the fixing directions of the magnets to the end face of the fiber are one way, and the magnetization directions of the magnets 103ba, 103bb are also one way, so that the orientations of the fiber and the magnet are one way, thus simplifying the preparation of the magnets 103ba, 103bb and the handling of the fiber.

Figure 3:
FIG. 3 is a sectional view for explaining an example of an optical fiber.

Further, in the example illustrated in FIG. 2B, in addition to the alignment in the direction perpendicular to the axis of the fiber, the alignment in the circumferential direction around the axis of the fiber is also possible, which is thus applicable for a fiber 201 having a non-axisymmetric core pattern, such as a multi-core fiber or a polarization-maintaining fiber as illustrated in FIG. 3, in addition to the normal single-core fiber. That is, when the magnets 103ba, 103bb are connected to the fiber while the plane dividing the N-pole and the S-pole is aligned with a specific direction of the core 202 in the fiber, specifically, with a direction connecting a stress-imparting member 203 of the polarization-maintaining fiber 201, the alignment between the polarization-maintaining fibers 201 can be simplified.

In the example illustrated in FIG. 2C, the magnetized portions of the magnets 103ba, 103bb illustrated in FIG. 2B are further divided. As illustrated in FIG. 2C, the two magnets 103ca, 103cb formed in a hollow cylindrical shape are divided into four parts around the axis of the hollow cylindrical shape, and the divided regions are magnetized such that the N-poles and the S-poles are alternately arranged in the circumferential direction. Thus, the example illustrated in FIG. 2C is effective when the placement of the core in the fiber is four-fold symmetric to the rotational direction of the axis of the hollow cylindrical shape. Similarly, when the placement of the core in the fiber is N-fold symmetric, the magnetized portion may be divided into N parts.

In the examples illustrated in FIGS. 2B and 2C, the region to be magnetized is divided around the axis of the fiber, and the shape (magnetization pattern) of the portion magnetized to have the N-pole or the S-pole is not formed into a circular shape, unlike the examples illustrated in FIGS. 1C and 2A, so that the degree of freedom around the central axis for rotating the fiber is controlled, and in addition to the alignment around the central axis of the fiber, the alignment corresponding to the placement of the peripheral structure (the other cores of the multi-core fiber or the stress-imparting material of the polarization-maintaining fiber) off the center of the fiber is also possible.

In FIG. 1A, only one end of the fiber 101a connected to the magnet 103a is illustrated while the other end of the fiber 101a is omitted, but it is needless to say that magnets may be provided at both ends of one fiber, and each fiber may have a structure as illustrated in FIG. 1A.

Further, in the example illustrated in FIG. 2B, the magnets 103ba, 103bb each have one N-pole and one S-pole, and these are arranged in the vertical direction, but it is needless to say that the magnets may each have two N-poles and two S-poles or three N-poles and three S-poles, and these may be arranged in the same direction.

Figure 4:
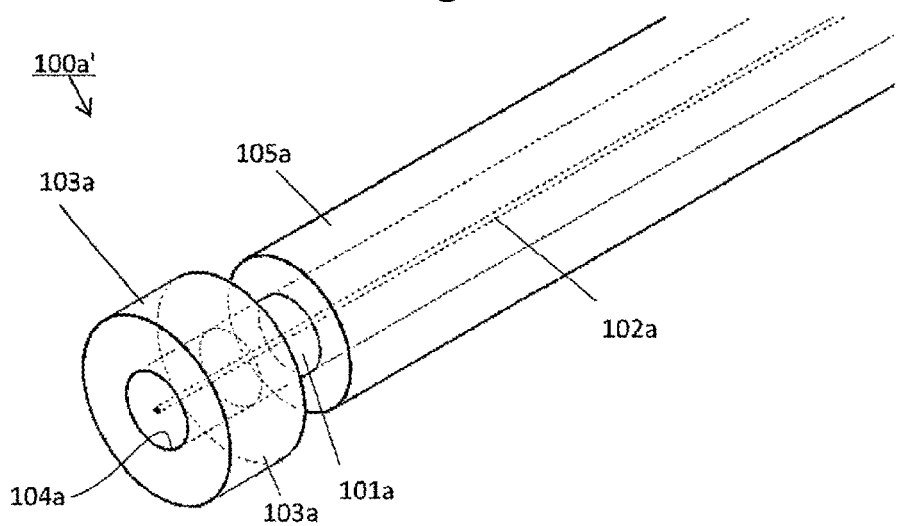
FIG. 4 is a perspective view illustrating a modification example of the optical connector according to the first embodiment.

In the optical connector according to the present embodiment, as illustrated in FIG. 4, the outer circumference of the fiber 101a may be covered with a covering material 105a. In FIG. 4, for convenience of illustration, a part of the fiber 101a is exposed in an optical connector 100a', but it is needless to say that the fiber 101a should not be exposed from the viewpoint of reliability.

Figure 5:
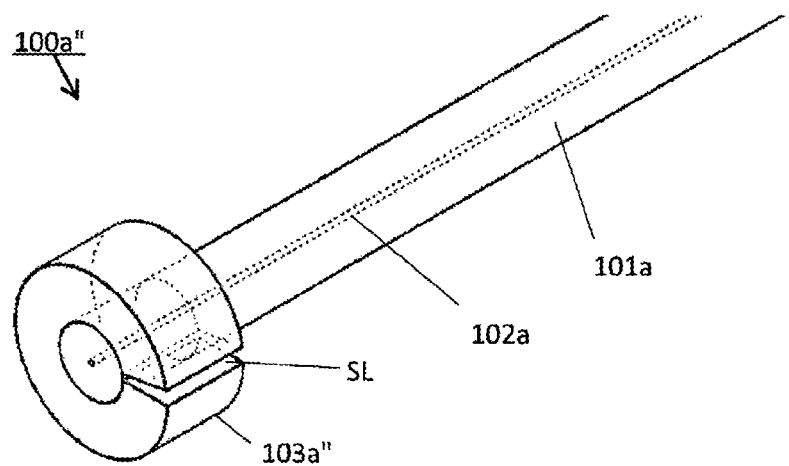
FIG. 5 is a perspective view illustrating a modification example of the optical connector according to the first embodiment.

In the optical connector according to the present embodiment, a magnet 103a" may include a slit SL as illustrated in FIG. 5.

According to this modification example, the inner diameter of the magnet 103a" can be adjusted with respect to the outer shape of the fiber 101a by the extent of the slit SL, and therefore, when the magnet 103a" is attached to the end of the fiber 101a, a gap between the inner diameter of the magnet and the outer diameter of the fiber can be eliminated. If the magnet having the N-pole and S-pole regions arranged around the axis of the fiber is to be used as illustrated in FIGS. 2B and 2C, a slit may be provided at the boundary between the S-pole and the N-pole.

Second Embodiment

Next, a second embodiment of the present invention will be described with reference to FIG. 6.

Figure 6:
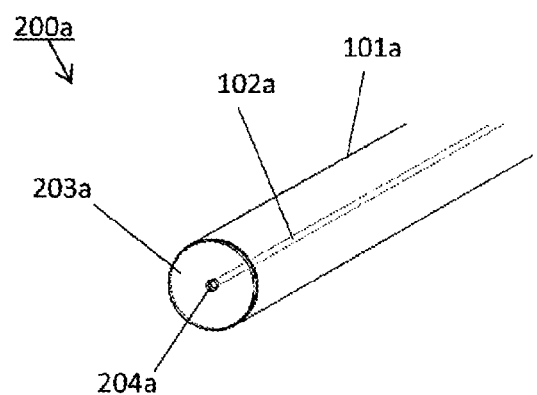
FIG. 6 is a perspective view illustrating an optical connector according to a second embodiment of the present invention.

In the first embodiment described above, the magnet 103a has been fixed to the outside of the fiber 101a, but in an optical connector according to the present embodiment, as illustrated in FIG. 6, a magnet 203a is disposed on the end face of the fiber 101a.

As illustrated in FIG. 6, the magnet 203a is formed in a disk shape, and an opening 204a for exposing the end face of the core 102a is formed in the central portion of the magnet 203a. In this case, optical signals are input and output to and from the fiber 101a through the opening 204a, so that the magnet 203a is disposed on the end face of the fiber 101a such that the center of the shape of the magnet 203a, that is, the center of the opening 204a and the center of the core 102a, match with each other.

For the magnetization form of the magnet 203a, following the example illustrated in FIG. 1C, the magnet 203a may be polarized in the direction along the axis of the fiber while being disposed on the end face of the fiber 101a such that the plane intermediate between the N-pole and the S-pole is perpendicular to the longitudinal direction of the fiber. Also, following the example illustrated in FIG. 2A, the magnetization may be performed such that the direction of polarization along the axis of the fiber 101a is opposite to each other at the central portion of the magnet 203a (i.e., a portion around the opening 204a) and the outer edge portion thereof. Further, following the examples illustrated in FIGS. 2B and 2C, the magnetization may be performed in the circumferential direction with the magnet 203a disposed on the end face of the fiber 101a such that one pair or a plurality of pairs of the N-pole and the S-pole are arranged around the axis of the fiber.

Note that the magnet 203a may be prepared in such a manner that a microfabricated small-sized magnet is pasted to the end face of the fiber 101a or that the material of the magnet is deposited on the end face of the fiber 101a by sputtering or the like and then magnetized. Although not illustrated in the drawings, the material of the magnet may be deposited in a cylindrical shape on the side surface of the fiber instead of the end face. In this way, a smaller structure can be achieved.

In the above, the machining accuracy of the roundness, the outer diameter, and the inner diameter of the circular magnet are important, but it is needless to say that a large number of magnets having the same machining error can be collectively formed by machining and forming magnets in a long cylindrical shape and finally cutting the magnets in the thickness directions thereof with a wire saw or the like, and the machining error can be offset by using those magnets that face each other.

Third Embodiment

Next, an optical connector and an optical connection structure according to a third embodiment of the present invention will be described with reference to FIGS. 7A and 7B.

Figure 7A:
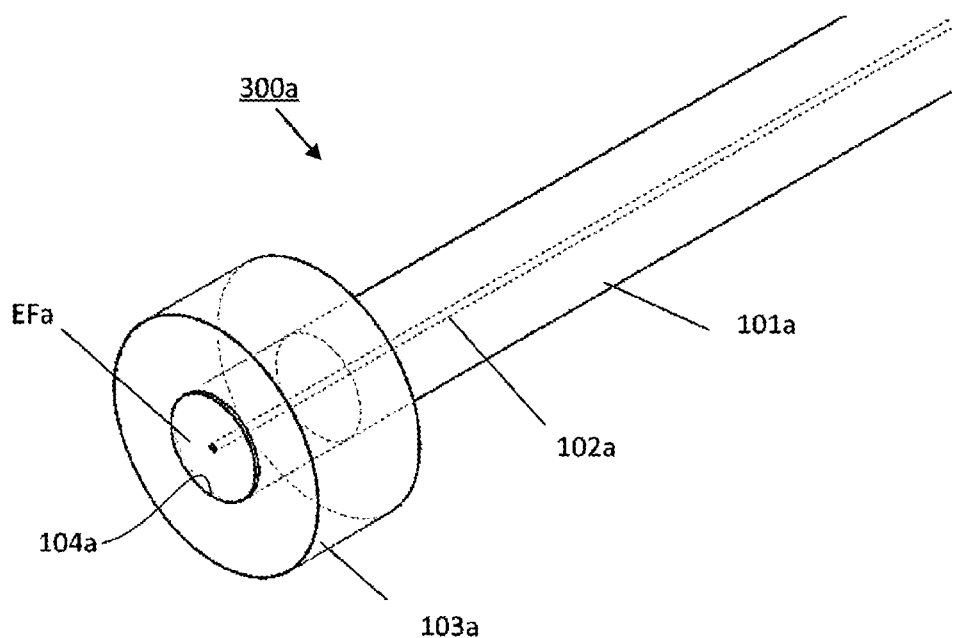
FIG. 7A is a perspective view illustrating a configuration of an optical connector according to a third embodiment of the present invention.
Figure 7B:
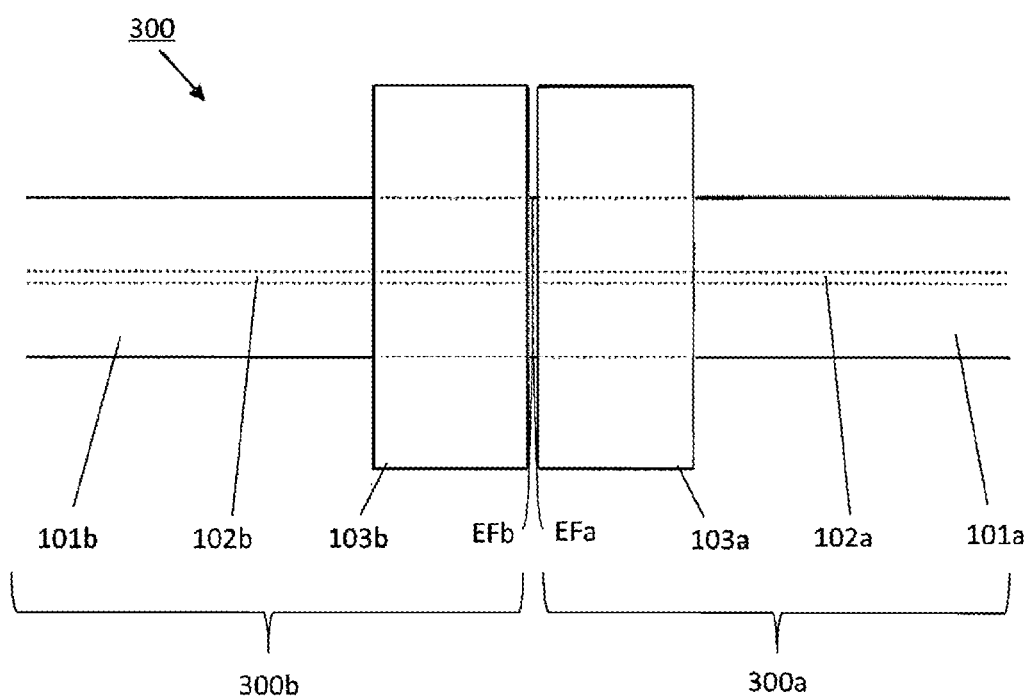
FIG. 7B is a view illustrating a configuration of an optical connection structure according to the third embodiment of the present invention.

The optical connector 100a according to the first embodiment described above has been configured such that the end face of the fiber 101a and the end face of the magnet 103a are flush with each other, but in an optical connector 300a according to the present embodiment, as illustrated in FIG. 7A, an end face EFa of the fiber 101a protrudes from the end face of the magnet 103a having the opening 104a.

In the present embodiment, it is assumed that the end face EFa of the fiber 101a protrudes from the end face of the magnet 103a by about 5 μm. As illustrated in FIG. 7B, the two optical connectors 300a, 300b are connected by the magnetic forces of the magnets 103a, 103b. Since the end faces EFa, EFb of the fibers 101a, 101b protrude from the end faces of the magnets 103a, 103b, the cores 102a, 102b on the end faces of the fibers are brought into contact with each other by the attraction of the magnets. Therefore, even when the surfaces of the magnets 103a, 103b have microirregularities, the insertion loss of the light passing through the cores 102a, 102b can be reduced.

Fourth Embodiment

Next, an optical connector and an optical connection structure according to a fourth embodiment of the present invention will be described with reference to FIGS. 8 and 9.

Figure 8:
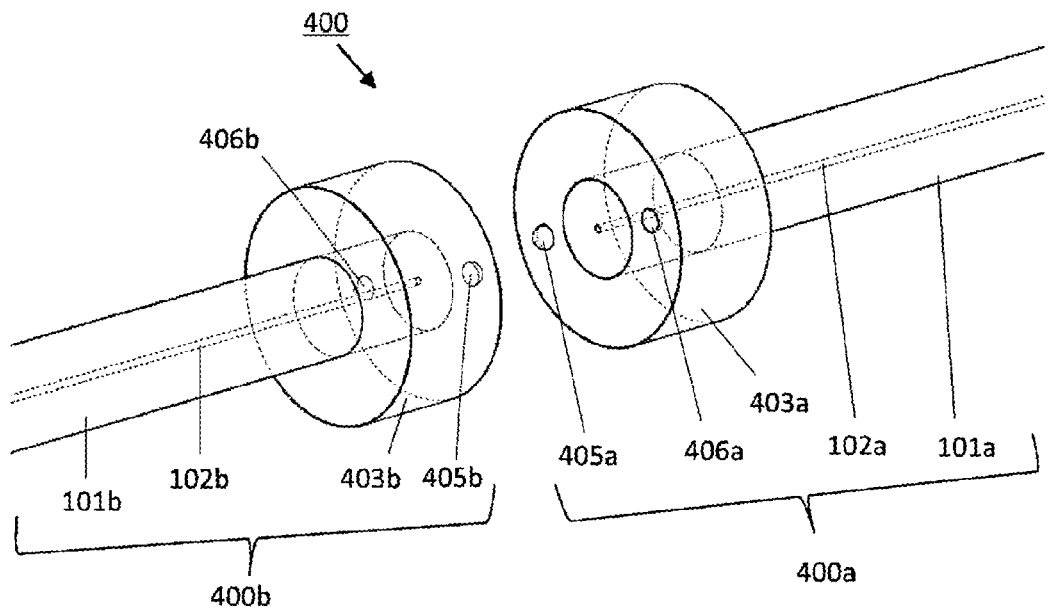
FIG. 8 is a view illustrating a configuration of an optical connection structure according to a fourth embodiment of the present invention.

In an optical connection structure 400 illustrated in FIG. 8, in an optical connector 400a, a protrusion 405a and a recess 406a are provided on the end face of a magnet 403a. Similarly, in the other optical connector 400b, a protrusion 405b and a recess 406b are provided on the end face of the magnet 403b.

Thus, when the magnets 403a, 403b of the two optical connectors 400a, 400b are brought into contact with each other by magnetic attraction, the protrusions 405a, 405b and the recesses 406a, 406b are fitted to each other. This enables the connection between the cores to be maintained even when a lateral force is applied to displace the magnets 403a, 403b within the plane of the connection between the magnets.

In the example illustrated in FIG. 8, the protrusions 405a, 405b and the recesses 406a, 406b are formed in a hemispherical shape but may be formed in a columnar shape such as a cylinder or a cylindrical shape.

Modification Example of Fourth Embodiment

Figure 9:
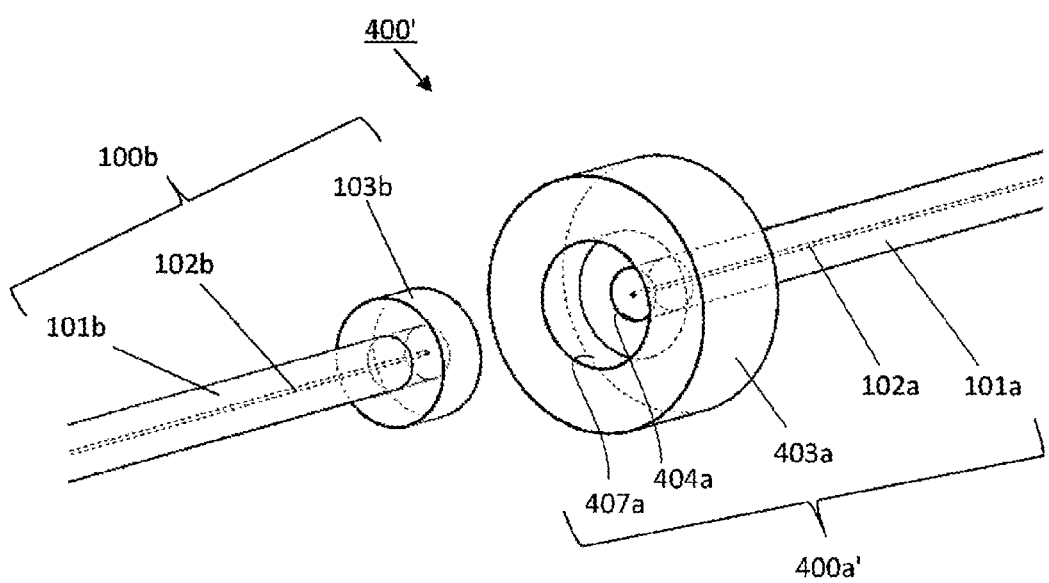
FIG. 9 illustrates a modification example of the optical connection structure according to the fourth embodiment of the present invention.

FIG. 9 illustrates a modification example of the fourth embodiment.

In the optical connection structure 400' illustrated in FIG. 9, a recess 407a is formed on the end face of a magnet 403a constituting one optical connector 400a'. At the bottom of the recess 407a, the end face of the fiber 101a is exposed from an opening 404a. The recess 407a of the magnet 403a has such a shape as to be fitted with the magnet 103b constituting the other optical connector 100b.

As thus described, the connection between the cores can also be maintained by fitting the magnet 103b of the other optical connector 100b to the magnet 403a of one optical connector 400a' even when a lateral force is applied to displace the magnets within the connection plane.

Fifth Embodiment

Next, an optical connection structure according to a fifth embodiment of the present invention will be described with reference to FIGS. 10A to 10C.

Figure 10A:
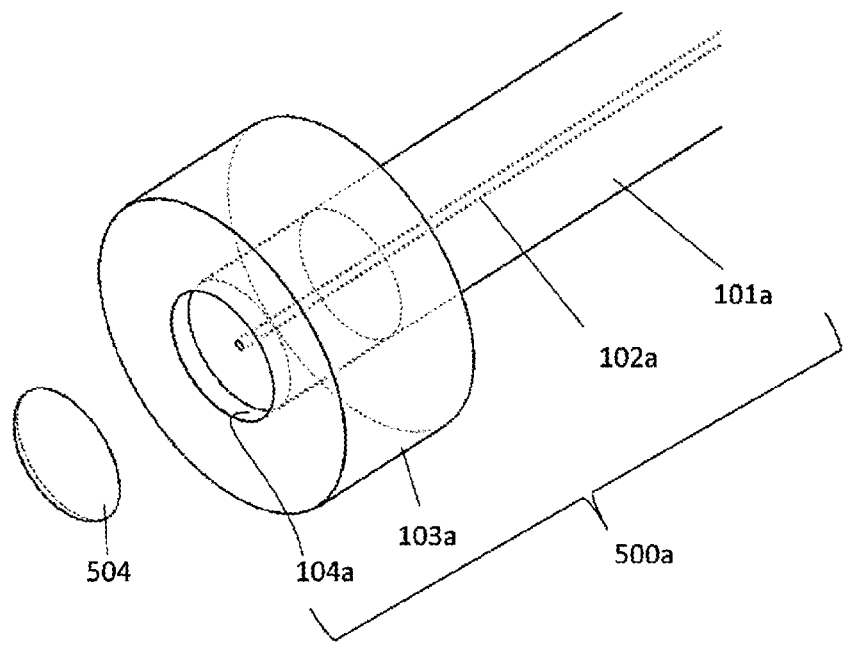
FIG. 10A is a view illustrating a configuration of an optical connector according to a fifth embodiment of the present invention.

In an optical connector 500a illustrated in FIG. 10A, the magnet 103a is disposed on the outer circumference of the fiber 101a. The end face of the fiber 101a is located inside the end face, having the opening 104a, of the magnet 103a attached to one end of the fiber 101a. In this example, the end face of the fiber 101a is disposed at a position recessed from the end face of the magnet 103a having the opening 104a by 20 μm.

With the end face of the fiber 101a being located inside the end face of the magnet 103a having the opening 104a, a space is formed in the opening 104a of the magnet 103a by the magnet 103a of the optical connector 500a and the fiber 101a. In the present embodiment, an optical element 504 is disposed in this space. In this way, by disposing the optical element in the space formed by the magnet 103a and the fiber 101a, light control can be performed. The optical element 504 is, for example, a lens.

Figure 10B:
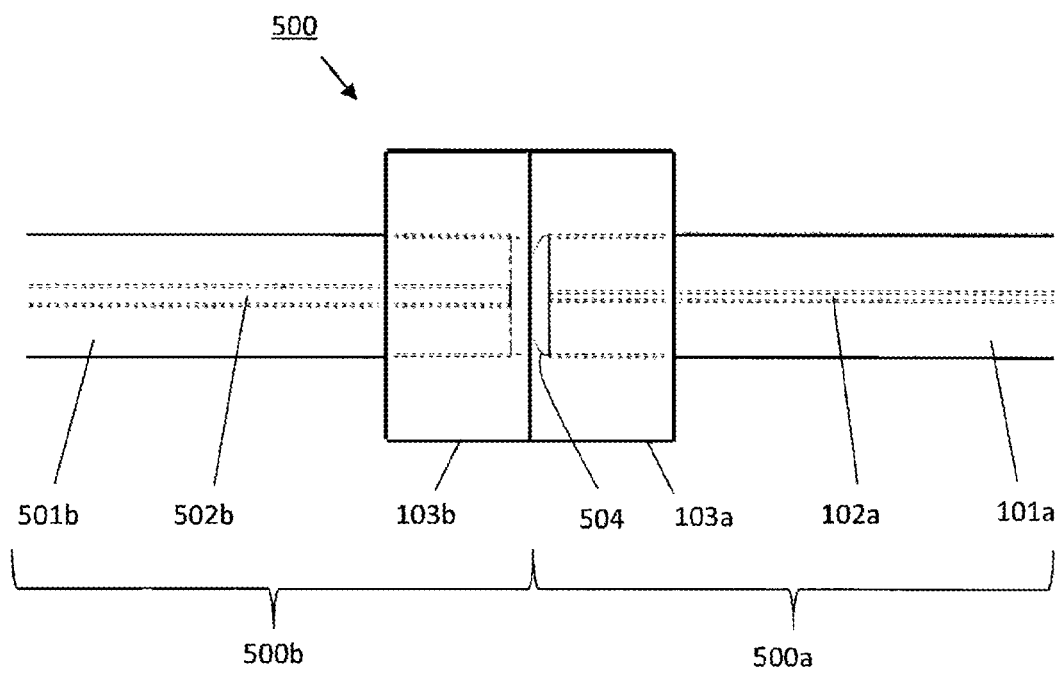
FIG. 10B is a view illustrating a configuration of an optical connection structure according to the fifth embodiment of the present invention.

As illustrated in FIG. 10B, an optical connection structure including the optical element 504 is effective at the time of optically connecting fibers having different core diameters. In FIG. 10B, for example, when light is transmitted from the core 102a having a core diameter of 9 μm to the core 502b having a core diameter of 20 μm, it is necessary to increase the mode field diameter. Therefore, the lens 504 is pasted to the end face of the fiber 101a. By matching the inner diameter of the opening of the magnet 103a with the outer diameter of the lens 504, the lens 504 is automatically aligned with the core 102a. When necessary, the lens 504 may be fixed to the end face of the fiber 101a with an adhesive or the like.

Figure 10C:
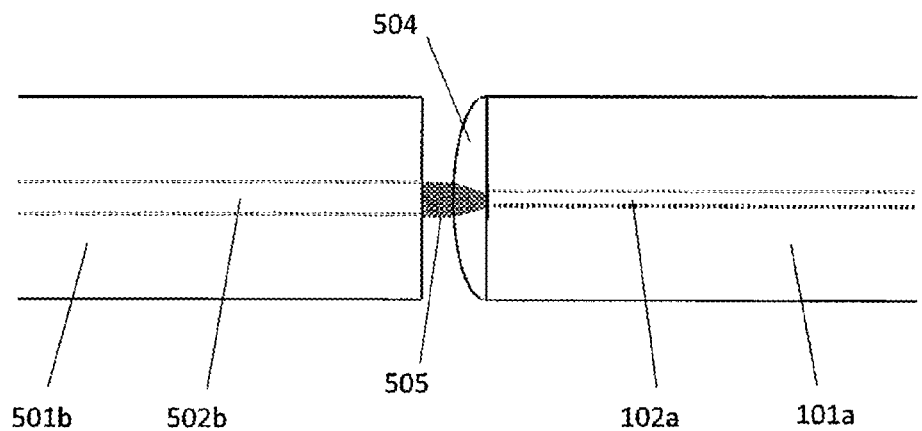
FIG. 10C is a view for explaining the optical connection structure according to the fifth embodiment of the present invention.

As illustrated in FIG. 10C, with a lens 504, light 505 emitted from the core 102a can be widened in beam diameter by the lens 504 to have a diameter suitable for the core 502b.

In FIG. 10C, the magnets 103a, 103b are omitted.

As described above, according to the present embodiment, in addition to two fibers, the optical element 504 can also be passively aligned in a small volume.

Sixth Embodiment

Figure 11A:
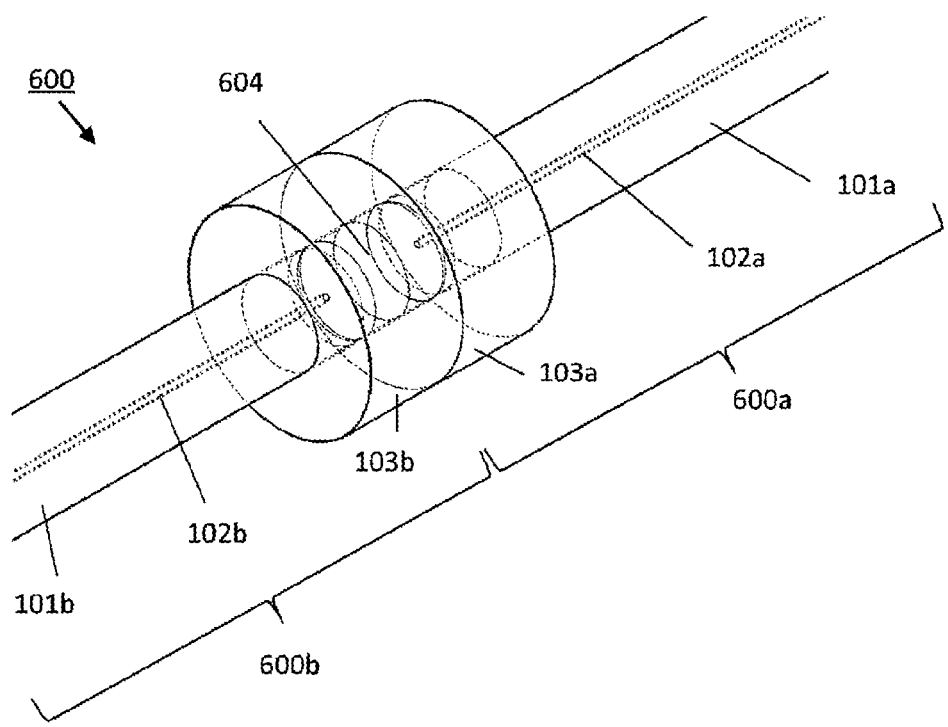
FIG. 11A is a view illustrating a configuration of an optical connection structure according to a sixth embodiment of the present invention.

Next, an optical connection structure according to a sixth embodiment of the present invention will be described with reference to FIGS. 11A to 11C.

In an optical connection structure 600 according to the present embodiment, as in the optical connection structure 500 according to the fifth embodiment described above, an optical element 604 is disposed in a space formed by the magnets 103a, 103b and the fibers 101a, 101b.

For example, in this example, the end face of the fiber 101a is located inside from the end face of the magnet 103a by 75 μm. In the other magnet 103b, the end face of the fiber 101b is located inside from the end face by 75 μm. As a result, when the magnet 103a of a first optical connector 600a and the magnet 103b of a second optical connector 600b are mechanically connected by magnetic forces, a space is formed by the magnets 103a, 103b and the fibers 101a, 101b. In the present embodiment, the optical element 604 is disposed in this space.

Figure 11B:
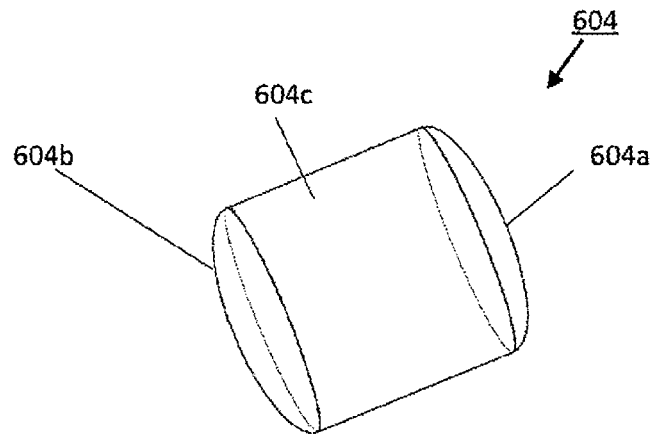
FIG. 11B is a view illustrating an example of an optical element used in the optical connection structure according to the sixth embodiment of the present invention.
Figure 11C:
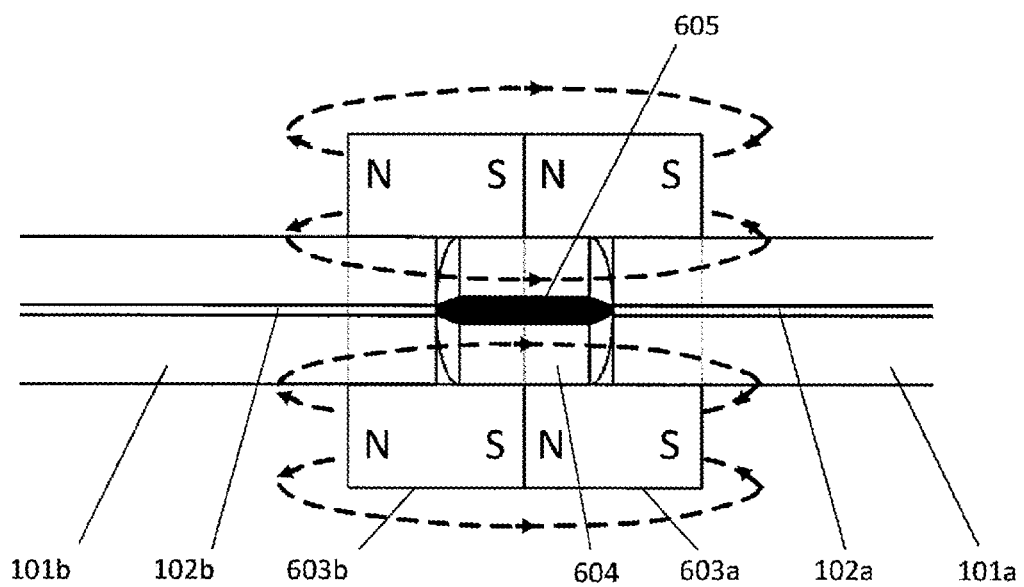
FIG. 11C is a view for explaining the optical connection structure according to the sixth embodiment of the present invention.

FIG. 11B illustrates the configuration of the optical element 604. The optical element 604 includes a Faraday rotator 604c including a garnet and lenses 604a, 604b provided at both ends of the Faraday rotator 604c. The shapes and refractive indices of the lenses 604a, 604b are appropriately designed in consideration of the refractive index of the Faraday rotator 604c, so that the lens 604a can make the light, emitted from the core 102a, into collimated light 605 having a beam shape as illustrated in the sectional view of FIG. 11C. The collimated light 605 passes through the Faraday rotator 604c and is then condensed by another lens 604b to enter the core 102b.

Here, the magnetic field formed by the magnets 103a, 103b is in the Faraday placement parallel to the traveling direction of the light, so that the polarization of the light is rotated in the Faraday rotator 604c by the magneto-optical effect (Faraday effect). In the example illustrated in the present embodiment, the length of the Faraday rotator 604c has been set to 110 μm, but the length may be set to a desired length in accordance with the amount of polarization rotation.

Further, by adding a polarization filter separately, functioning as an isolator is possible.

Modification Example of Sixth Embodiment

When the magnets illustrated in FIG. 2B are used as the magnets 103a, 103b, the Voigt placement can be set in which a magnetic field is applied perpendicularly to the traveling direction of light, so that light separation corresponding to polarization or the like is possible as a state where the magneto-optical effect (Cotton-Mouton effect) is exerted to cause birefringence.

Figure 12A:
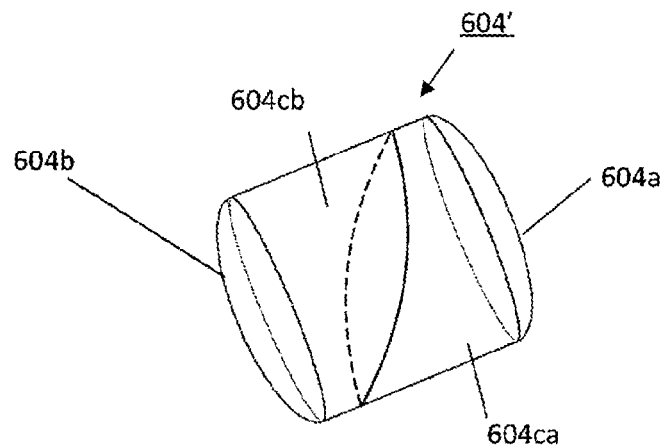
FIG. 12A is a view illustrating another example of the optical element used in the optical connection structure according to a modification example of the sixth embodiment of the present invention.
Figure 12B:
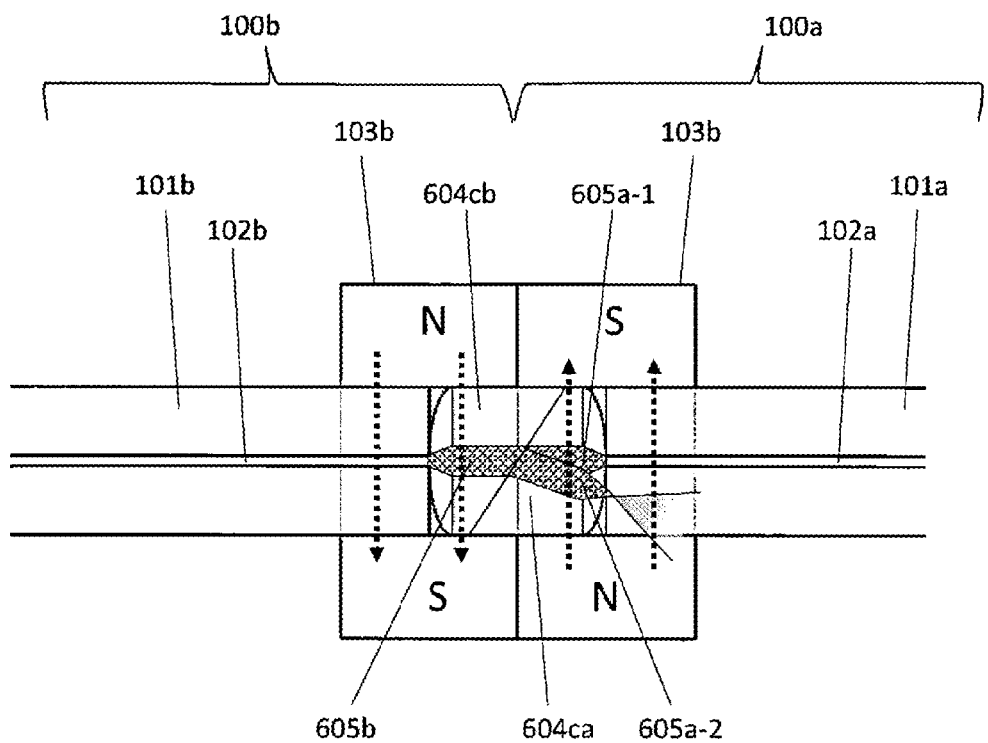
FIG. 12B is a view for explaining the optical connection structure according to a modification example of the sixth embodiment of the present invention.

FIGS. 12A and 12B illustrate modification examples of the optical connection structure according to the sixth embodiment.

In the modification example illustrated in FIG. 12A, the optical element 604' has the same configuration as the optical element 604 described above, but the optical element corresponding to the Faraday rotator 604c is made up of a portion 604ca made of a material having a magneto-optical effect, such as garnet, and a portion 604cb made of a material having no magneto-optical effect.

By appropriately designing the shapes and refractive indices of the lenses 604a, 604b, a beam shape as illustrated in FIG. 12B can be obtained. That is, light emitted from the core 102b becomes collimated light 605b in the portion 604cb made of the material having no magneto-optical effect and enters the portion 604ca made of the material having the magneto-optical effect.

At this time, when the two magnets 103a, 103b formed in a hollow cylindrical shape are polarized into regions divided by a plane including the axis of the hollow cylindrical shape as illustrated in FIG. 2B, the magnetic field formed by the magnets 103a, 103b is disposed perpendicular to the traveling direction of light, and hence the magneto-optical effect (Cotton-Mouton effect) induces anisotropy in the refractive index of the portion 604cb made of the material having the magneto-optical effect. As a result, the angle at the interface between the portion 604cb made of the material having no magneto-optical effect and the portion 604ca made of a material having a magneto-optical effect changes in accordance with the polarization plane of light. Thereby, the traveling direction of the light changes depending on whether the polarization plane is parallel or perpendicular to the direction of the magnetic field, and light 605a-1 and light 605a-2 having different polarization planes travel separately. As a result, the light 605a-1 enters the core 102a again, while the light 605a-2 does not enter the core and becomes diffused light. In this way, light beams can be separated in accordance with polarization.

As described above, according to the present modification example, in addition to two fibers, the optical element can also be passively aligned in a compact manner, and furthermore, the polarization state of the light passing through the fiber can be controlled using the magneto-optical effect.

Seventh Embodiment

Next, a seventh embodiment of the present invention will be described with reference to FIGS. 13A and 13B.

While the first to sixth embodiments described above have each related to the optical connection structure used in the case of the connection between the fibers, embodiments of the present invention can also be applied to a connection between a fiber and a chip or the like.

Figure 13A:
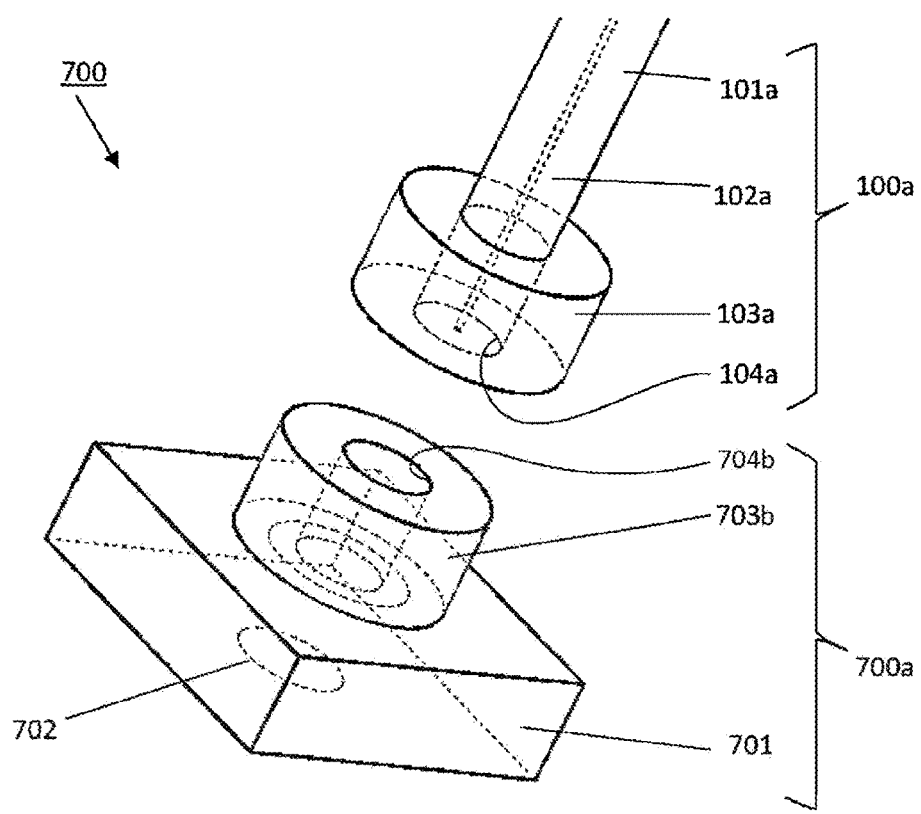
FIG. 13A is a view illustrating a configuration of an optical connection structure according to a seventh embodiment of the present invention.

As illustrated in FIG. 13A, an optical connection structure according to the seventh embodiment of the present invention is made up of a first optical connector 100a and a second optical connector 700b. Here, like the optical connector 100a used in the first embodiment, the first optical connector 100a has the magnet 103a attached to one end of the fiber 101a. On the other hand, the second optical connector 700b includes an optical element 701 and a magnet 703b attached to the optical element 701, and an opening 704b is formed in the magnet 703b to expose a part of the optical element 701.

The magnet 103a of the first optical connector 100a and the magnet 703b of the second optical connector 700b are magnetized so as to exert the attraction on each other. As a specific form of the magnetization, for example, those illustrated in FIGS. 1C and 2A to 2C can be employed.

When the magnet 103a of the first optical connector 100a and the magnet 703b of the second optical connector 700b are mechanically connected to each other by magnetic forces, the core 102a of the first optical connector 100a and the optical element 701 of the second optical connector 700b can be optically connected through the opening 104a of the magnet 103a of the first optical connector 100a and the opening 704b of the magnet 703b of the second optical connector 700b.

The optical element 701 is, for example, a chip 701 provided with a light-receiving element. As illustrated in FIG. 13A, a light-receiving surface 702 and an electric terminal (not illustrated) are formed on the lower surface of the chip 701. The chip 701 is mounted as a bare chip on a printed circuit board or the like by using the surface mounting technology.

Figure 13B:
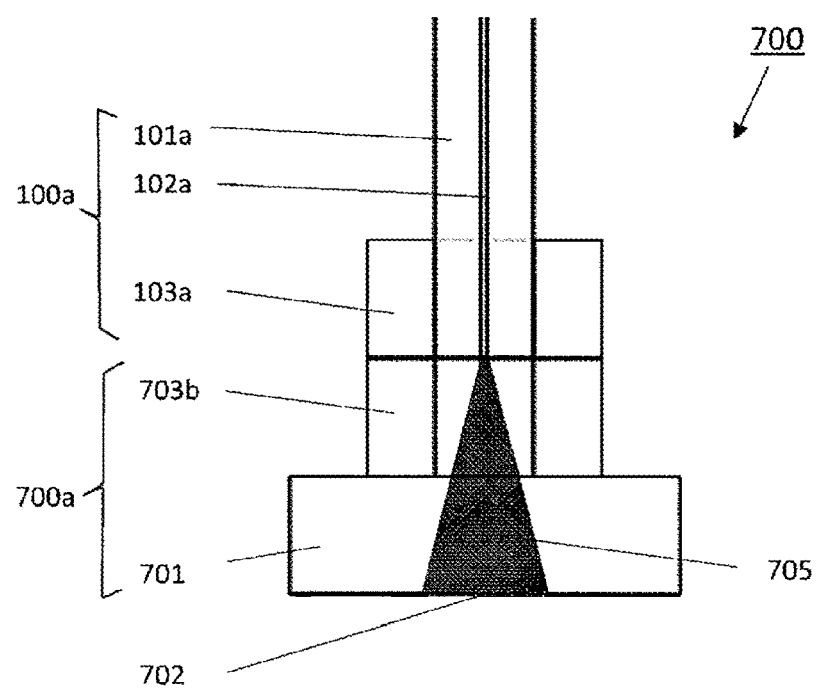
FIG. 13B is a view for explaining an optical connection structure according to the seventh embodiment of the present invention.

In this case, as illustrated in FIG. 13B, in a state where the first optical connector 100a and the second optical connector 700b are connected, that is, in a state where the magnet 103a and the magnet 703b are mechanically connected by magnetic forces, light emitted from the core 102a of the fiber 101a enters the chip 701 from the upper surface thereof, passes through the inside, and reaches the light-receiving portion on the lower surface. By using the magnet 103a and the magnet 703b, the chip 701 and the fiber 101a are aligned passively.

As illustrated in FIG. 13B, the magnet 703b is disposed with respect to the light-receiving surface 702 and fixed to the chip 701. In this state, when the fiber 101a having the magnet 103a is brought close, alignment is automatically performed by the attraction of the magnets. At this time, the light emitted from the core 102a of the fiber 101a spreads like a beam shape 705 and reaches the light-receiving surface 702.

It is needless to say that the optimum sensitivity can be obtained when the distance between the end face of the fiber and the light-receiving surface is adjusted by making the magnet 703 thin in accordance with the size of the light-receiving surface 702 or by projecting the fiber 101a from the magnet 103a and fixing the projected fiber 101a.

According to the optical connection structure of the present embodiment, not only the fiber and the chip can be connected in small size and in a passive manner, but also the distance between the end face of the fiber and the chip light-receiving surface can be shortened by size reduction, and hence there is an excellent effect that direct optical connection can be performed without the inclusion of an optical element such as a lens.

Eighth Embodiment

Next, an optical connection structure according to an eighth embodiment of the present invention will be described with reference to FIGS. 14A and 14B.

The optical connection structure according to the eighth embodiment is made up of a first optical connector 100a and a second optical connector 800b using a magnet as a part of a conventional CAN package. As illustrated in FIG. 14A, a chip 806 is fixed to the inside center of a package 805 on the second optical connector 800b side. The chip 806 is, for example, a light-receiving element. A cap 804 is welded to the package 805. A lens 801 and a magnet 803b are fixed to the cap 804. The lens 801 and the magnet 803b are disposed on the same axis.

Figure 14A:
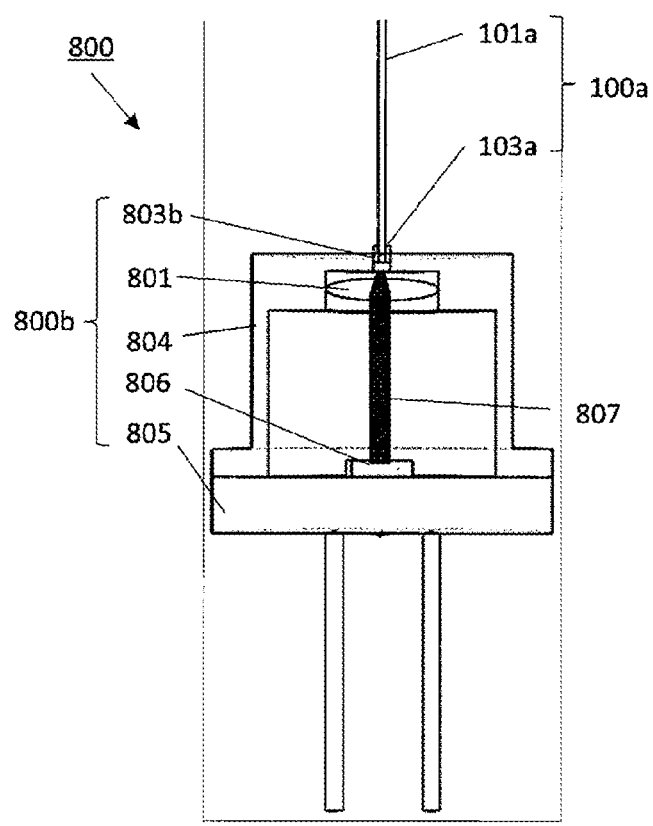
FIG. 14A is a view illustrating a configuration of an optical connection structure according to an eighth embodiment of the present invention.
Figure 14B:
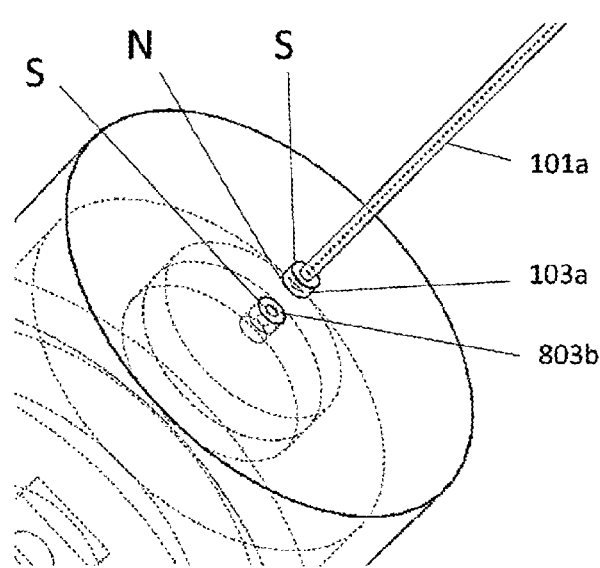
FIG. 14B is a view for explaining the optical connection structure according to the eighth embodiment of the present invention.
Figure 15:
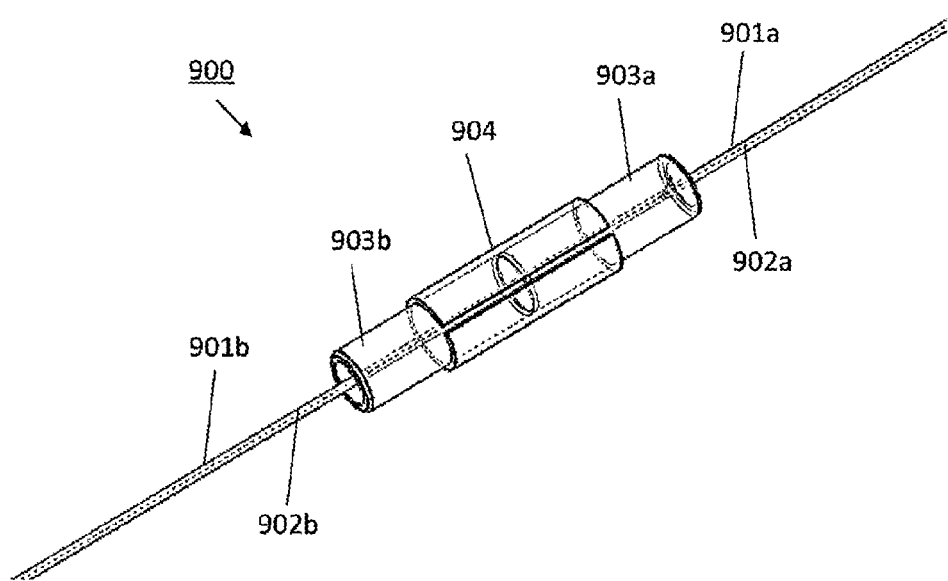
FIG. 15 is a view illustrating an example of a conventional optical connection structure.
Figure 16:
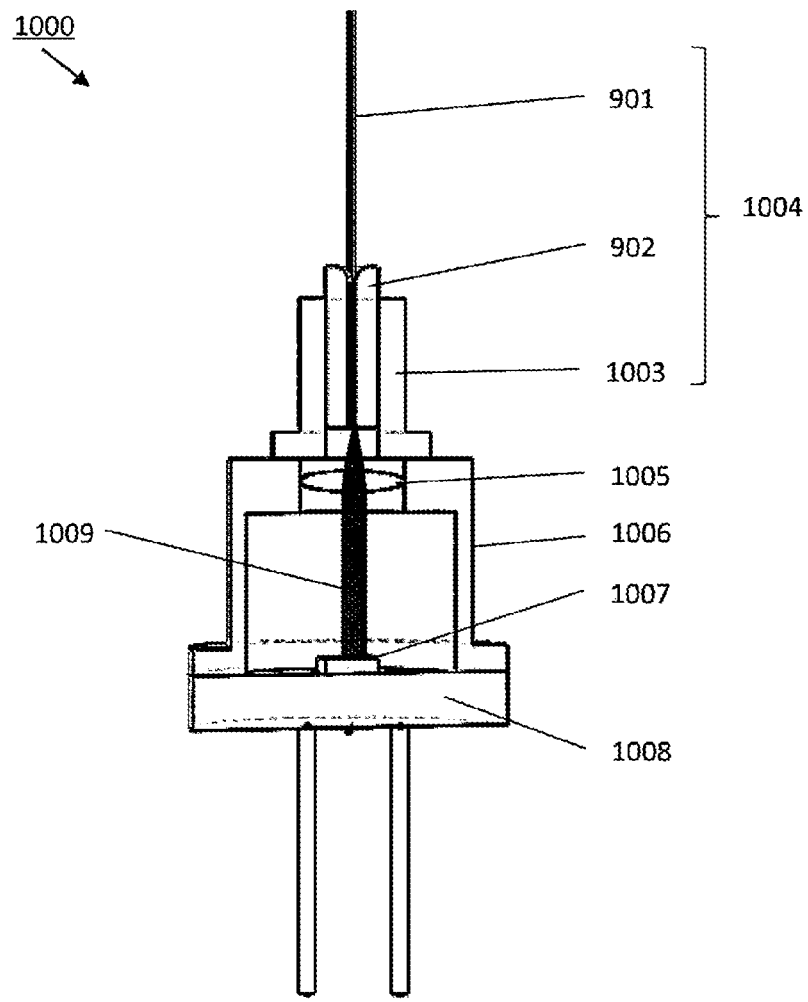
FIG. 16 is a view illustrating another example of a conventional optical connection structure.

FIG. 14B is an enlarged view of a part of an optical connection structure 8oo illustrated in FIG. 14A. The magnet 103a and the magnet 803b are made to have the same size, and for example, as described in the first embodiment, the magnet 103a and the magnet 803b are appropriately magnetized so as to exert the attraction. Therefore, when the optical connector 100a having the magnet 103a is brought close, the magnet 103a and the magnet 803b are attracted to each other and aligned automatically. At that time, light 807 emitted from the fiber 101 is collimated by the lens 801 and reaches the chip 806.

As described above, according to the eighth embodiment, there is an effect that the three-body alignment of the fiber 101, the chip 806, and the lens 801 can be performed simply and in a small structure.

Although the light-receiving element has been shown as an example of the optical element in the present embodiment, it is needless to say that the optical connection structure according to embodiments of the present invention can also be applied to a case where a light-emitting element, a lens mirror, or the like, is used as the optical element. Further, although the optical connection between the bare chip or the package and the fiber has been shown, it is needless to say that a connection with a module or the forms can be made in the same manner.

REFERENCE SIGNS LIST

100 Optical connection structure
100*a*, 100*b* Optical connector
101*a*, 101*b* Fiber
102*a*, 102*b* Core
103*a*, 103*b* Magnet
104*a*, 104*b* Opening
504, 604 Optical element
701 Chip
805 Package

The invention claimed is:

1. An optical connection structure comprising:
   a first optical connector comprising:
      a fiber having a core through which light is guided; and
      a first magnet surrounding and directly attached to an exterior circumference of a sidewall of the fiber at one end of the fiber, wherein the first magnet has a first opening that exposes at least an end face of the core; and
   a second optical connector comprising:
      an optical element; and
      a second magnet surrounding and directly attached to an exterior circumference of the optical element, wherein the second magnet of the second optical connector has a second opening that exposes at least a part of the optical element;
   wherein the first magnet of the first optical connector and the second magnet of the second optical connector are magnetized so as to exert attraction on each other; and
   wherein, in a state in which the first optical connector and the second optical connector are mechanically connected by magnetic forces, the core of the first optical connector and the optical element of the second optical connector are optically connected through the first opening of the first magnet of the first optical connector and the second opening of the second magnet of the second optical connector.

2. The optical connection structure according to claim 1, wherein:
   an end face of the core of the fiber of the first optical connector and an end face of the optical element of the second optical connector protrude from an end face of the first magnet of the first optical connector having the first opening and an end face of the second magnet of the second optical connector having the second opening, respectively.

3. The optical connection structure according to claim 1, wherein an outer shape of a cross section of the first magnet perpendicular to a longitudinal direction of the fiber is the same as an outer shape of a cross section of the core perpendicular to the longitudinal direction of the fiber.

4. The optical connection structure according to claim 1, wherein the first magnet has one N-pole and one S-pole, and a plane intermediate between the N-pole and the S-pole is perpendicular to a longitudinal direction of the fiber.

5. The optical connection structure according to claim 1, wherein the first magnet has at least one N-pole and at least one S-pole, and a plane intermediate between the N-pole and the S-pole has a cylindrical shape surrounding an axis along a longitudinal direction of the fiber.

6. The optical connection structure according to claim 1, wherein the optical element of the second optical connector comprises a chip.

7. An optical connector comprising:
   a fiber having a core through which light is guided; and
   a magnet surrounding and directly attached to an exterior circumference of a sidewall of the fiber at one end of the fiber, wherein the magnet has an opening that exposes an end face of the core.

8. The optical connector according to claim 7, wherein the magnet has an N-pole and an S-pole, and wherein the magnet comprises a slit at a boundary between the S-pole and the N-pole.

9. The optical connector according to claim 7, wherein the magnet has a hollow cylindrical shape divided into four parts around an axis of the hollow cylindrical shape, and wherein the four parts are magnetized such that two N-poles and two S-poles are alternatively arranged in a circumferential direction.

10. The optical connector according to claim 7, wherein an outer shape of a cross section of the magnet perpendicular to a longitudinal direction of the fiber is about the same as an outer shape of a cross section of the core perpendicular to the longitudinal direction of the fiber.

11. The optical connector according to claim 7, wherein the magnet has one N-pole and one S-pole, and a plane intermediate between the N-pole and the S-pole is perpendicular to a longitudinal direction of the fiber.

12. The optical connector according to claim 7, wherein the magnet has at least one N-pole and at least one S-pole, and a plane intermediate between the N-pole and the S-pole has a cylindrical shape surrounding an axis along a longitudinal direction of the fiber.

13. An optical connection structure comprising:
   a first optical connector comprising:
      a first fiber having a first core through which light is guided; and
      a first magnet surrounding and directly attached to an exterior circumference of a sidewall of the first fiber at one end of the first fiber, wherein the first magnet has a first opening that exposes an end face of the first core; and
   a second optical connector comprising:
      a second fiber having a second core through which the light is guided; and
      a second magnet surrounding and directly attached to an exterior circumference of a sidewall of the second fiber at one end of the second fiber, wherein the second magnet has a second opening that exposes an end face of the second core;
   wherein the first magnet of the first optical connector and the second magnet of the second optical connector are magnetized so as to exert attraction on each other; and
   wherein, in a state in which the first optical connector and the second optical connector are mechanically connected by magnetic forces, the first core of the first optical connector and the second core of the second optical connector are optically connected through the first opening of the first magnet of the first optical connector and the second opening of the second magnet of the second optical connector.

14. The optical connection structure according to claim 13, further comprising an optical element, wherein:
the end face of the first fiber of the first optical connector is located inside the first magnet a predetermined distance from an end face of the first magnet having the first opening; and
in the state in which the first optical connector and the second optical connector are mechanically connected by the magnetic forces, the optical element is disposed in a space provided by the first magnet and the first fiber of the first optical connector and the second magnet and the second fiber of the second optical connector.

15. The optical connection structure according to claim 14, wherein the optical element is a lens.

16. The optical connection structure according to claim 13, wherein an outer shape of a cross section of the first magnet perpendicular to a longitudinal direction of the first fiber is the same as an outer shape of a cross section of the first core perpendicular to the longitudinal direction of the first fiber.

17. The optical connection structure according to claim 13, wherein the first magnet has one N-pole and one S-pole, and a plane intermediate between the N-pole and the S-pole is perpendicular to a longitudinal direction of the first fiber.

18. The optical connection structure according to claim 13, wherein the first magnet has at least one N-pole and at least one S-pole, and a plane intermediate between the N-pole and the S-pole has a cylindrical shape surrounding an axis along a longitudinal direction of the first fiber.

* * * * *